(12) United States Patent
Branch et al.

(10) Patent No.: US 7,572,745 B2
(45) Date of Patent: Aug. 11, 2009

(54) FLUID TRANSFER HOSE REINFORCED WITH HYBRID YARN

(75) Inventors: Morris Branch, Bennett, CO (US); Yelena Gray, Parker, CO (US); Doug Schelhaas, Aurora, CO (US)

(73) Assignee: The Gates Corporation, Denver, CO (US)

( * ) Notice: Subject to any disclaimer, the term of this patent is extended or adjusted under 35 U.S.C. 154(b) by 351 days.

(21) Appl. No.: 11/527,174

(22) Filed: Sep. 26, 2006

(65) Prior Publication Data

US 2008/0072984 A1 Mar. 27, 2008

(51) Int. Cl.
*D04B 1/14* (2006.01)
*B32B 5/26* (2006.01)
*D02G 3/00* (2006.01)

(52) U.S. Cl. ............... 442/310; 442/319; 428/364; 428/365; 428/377

(58) Field of Classification Search .............. 442/310, 442/319; 428/377, 364, 365
See application file for complete search history.

(56) References Cited

U.S. PATENT DOCUMENTS

| | | | |
|---|---|---|---|
| 4,242,296 A | 12/1980 | Bricker | 264/149 |
| 4,679,600 A | 7/1987 | Dougherty | 138/128 |
| 4,914,902 A | 4/1990 | Keefe, Jr. | 57/210 |
| 5,091,243 A | 2/1992 | Tolbert et al. | 428/253 |
| 5,229,056 A | 7/1993 | De Meyer et al. | 264/173 |
| 5,321,960 A | 6/1994 | Whitt et al. | 66/182 |
| 5,691,030 A | 11/1997 | De Meyer | 428/107 |
| 6,435,217 B1 | 8/2002 | Bertero et al. | 138/126 |
| 6,601,378 B1 | 8/2003 | Fritsch et al. | |
| 6,742,545 B2 | 6/2004 | Fisher et al. | 138/137 |
| 6,855,423 B2 | 2/2005 | Fidan et al. | 428/375 |
| 2002/0155287 A1* | 10/2002 | Nelson et al. | 428/359 |
| 2005/0091960 A1* | 5/2005 | Akiyama et al. | 57/222 |
| 2005/0238832 A1* | 10/2005 | Kostamo | 428/36.91 |

FOREIGN PATENT DOCUMENTS

| | | | |
|---|---|---|---|
| JP | 6008376 A | | 1/1994 |
| JP | 2006-161225 | * | 6/2006 |
| WO | WO 2006/000735 A | | 5/2006 |

OTHER PUBLICATIONS

International Search Report and the Written Opinion of the International Searching Authority; Feb. 22, 2008; PCT/US2007/020491.

* cited by examiner

*Primary Examiner*—Norca L Torres-Velazquez
(74) *Attorney, Agent, or Firm*—P. N. Dunlap, Esq.; J. A. Thurnau, Esq.; J. L. Mahurin, Esq.

(57) ABSTRACT

A flexible hose comprising a tube, a knit fabric, and a cover. The knit fabric comprises a hybrid yarn which comprises a first yarn of co-para-aramid fibers and a second yarn of meta-aramid fibers. The hose exhibits significantly improved burst pressure and/or improved impulse fatigue resistance.

20 Claims, 1 Drawing Sheet

FLUID TRANSFER HOSE REINFORCED WITH HYBRID YARN

BACKGROUND OF THE INVENTION

The present invention pertains to a transfer hose comprising a hybrid reinforcing yarn wherein the reinforcing yarn comprises a co-para-aramid copolymer yarn and a meta-aramid yarn twisted together.

Flexible, low-pressure hose is used in a variety of fluid transfer applications such as in automotive radiator and heater hose and charge air hoses for connecting turbochargers to charge air coolers ("CAC"). By "low-pressure" is meant a hose that meets a maximum working pressure rating in the vicinity of up to about 20 bars, or up to about 350 psi, according to general usage in the field. Flexibility permits the hose to accommodate movement, vibration, installation misalignment, and thermal expansion and contraction. Flexibility is provided by rubber, elastomer, and/or plastic materials used to form the bulk of the hose. Reinforcement is necessary to withstand internal pressures and/or external forces. Textile yarns or fabrics, plastics, and metals are generally used as reinforcements in hose. Reinforcements are applied in one or more layers between an inner tube and an outer cover. Textile yarn reinforcements are applied to the inner tube by braiding, knitting, spiraling, or wrapping in one or more plies or layers. Knit reinforcement provides less strength than braiding, spiraling, or wrapping, as well as a tendency to unravel if a yarn is broken. Also, knitting results in looped yarns of very small bend radius, with high compressive forces on the inside of the bends, which tends to cause kink bands and reduced tensile strength in high-modulus fibers such as para-aramids. Knitting also involves yarns looped around other yarns, creating friction points where the yarns can cut or abrade through each other. Strength loss during the knitting process is significant so that para-aramid knit reinforced hose does not have the initial burst strength one would expect from such reinforcement. Nevertheless, knit reinforcements are often preferred for shaped or curved low-pressure hoses, because knits provide a very flexible type of fabric reinforcement.

The hose performance requirements for dynamic fatigue resistance, temperature resistance, and internal pressure-carrying capability have increased dramatically for some applications. The need to reduce costs is also ever present. For example, modern automotive and truck applications, such as radiator, coolant and CAC hoses, face increased demands. Higher strength and modulus cords, including those formed of polyethylene naphthalate (PEN), poly(p-phenylene-2,6-benzobisoxazole) (PBO), para-aramid, carbon, or liquid crystal polymer (LCP) are known to exhibit higher pressure carrying capability, but are known to exhibit relatively poor dynamic fatigue resistance, particularly after undergoing the knitting process and when tightly bent at friction points as mentioned above in connection with knitting. Typical commercial CAC hose utilizes multiple layers of wrapped fabric textile reinforcement and/or metal reinforcing bands to achieve sufficient burst pressure ratings. Among known textiles in use for CAC hose are multi-ply woven fiberglass fabric, multi-ply NOMEX® or polyester, fabric plies of KEVLAR® or Twaron® para-aramid blended with NOMEX® meta-aramid. Among known textiles in heater hose are nylon, KEVLAR®, and NOMEX® braided reinforcements.

Aramid yarns are widely used for reinforcement in hoses. An example is U.S. Pat. No. 6,742,545 wherein multiple reinforcement layers and protective jackets are combined and a variety of materials recommended, including aramids, in order to construct a high-pressure industrial transfer hose capable of withstanding high external pressures. There is no suggestion as to how to improve the performance of a simpler, aramid-knit-reinforced, low-pressure hose without adding additional layers of reinforcement.

In order to improve the retained strength after use, it is known to use composite cords composed of a core yarn and a sheath of twisted yarns plied around the core. An example is U.S. Pat. No. 4,912,902. The sheath is preferably aramid, which imparts high strength to the cord, but would not be expected to improve the self-cutting problem in a knit reinforcement. Fabrication of the core-sheath construction adds cost and/or complexity to the reinforcement.

In an unrelated field, it is known to combine various high-performance, fire-resistant fibers, such as para- and meta-aramids, to improve knitted fabrics for fire-resistance, breathability, and flexibility in protective apparel or upholstery. An example is U.S. Pat. No. 5,091,243 wherein core-sheath yarns having a core of glass, KEVLAR®, NOMEX®, carbon, polybenzimidazole, metals, etc. or blends thereof, and a sheath of staple cotton, polyester, rayon, wool or the like, are utilized in a fire barrier upholstery fabric. It is not known or suggested to use flame barrier fabrics as encapsulated reinforcement in fluid transfer hoses for improved dynamic performance.

Thus, the prior art fails to disclose a reinforcing yarn with sufficient strength and flexibility to endure a knitting process and to provide a knit-reinforced hose with good impulse fatigue resistance and sufficient burst strength to meet modern automotive requirements for low-pressure, fluid-transfer hose. Neither does the art teach a low-pressure, fluid transfer hose reinforced with a knit reinforcement comprising a hybrid yarn of a blend of co-para-aramid and meta-aramid fibers.

SUMMARY OF THE INVENTION

The invention provides an improved yarn for a knit reinforcement in flexible hose for improved performance in a dynamic application under pressure, vibration, and heat. The present invention provides a low-pressure fluid-transfer hose exhibiting improved impulse fatigue resistance. A flexible hose according to the present invention may comprise a tube, a knit fabric, and a cover; wherein said knit fabric comprises a hybrid yarn comprising a first yarn of co-para-aramid fibers and a second yarn of meta-aramid fibers. The co-para-aramid and meta-aramid yarns may be twisted, plied, folded, or commingled together to form a single hybrid reinforcing yarn for the hose. A twist level of up to about 5 TPI may be applied to the hybrid yarn. The co-para-aramid may be co-poly(p-phenylene terephthalamide/3,4'-oxydiphenylene terephthalamide) or TECHNORA® fiber, and the meta-aramid may be poly(m-phenylene isophthalamide) or NOMEX® fiber. The hybrid yarn may have a surface comprising both co-para-aramid fibers and meta-aramid fibers. The knit fabric may reside between a tube and a cover and/or may be embedded in a layer of the hose. One or more layers of a knit fabric of hybrid yarn may be the primary reinforcing member of a hose. A knit fabric reinforcement may comprise from about 50 to about 200 loops per foot.

A hose assembly or fluid transfer system embodiment of the invention may comprise one or more sections of inventive hose, one or more clamps, fittings, and/or couplings, a fluid handling device, and/or the like. The inventive hose may be a radiator hose, a heater hose, or CAC hose.

Also provided is a method comprising combining at least a first base yarn comprising co-para-aramid and a second base yarn comprising meta-aramid to form a hybrid yarn; forming a tube; knitting the hybrid yarn to form a reinforcing fabric layer on the tube; and forming a cover about the tube and fabric layer. The method might also comprise adhesively treating a first and/or second base yarn and/or the hybrid yarn, twisting the hybrid yarn up to about 5 TPI, and/or knitting with from about 50 to about 200 loops per foot.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

The accompanying drawings, which are incorporated in and form a part of the specification, illustrate embodiments of the invention, and together with the description, serve to explain the principles of the invention. In the drawings, like numerals denote like parts and.

DETAILED DESCRIPTION

Figure 1:
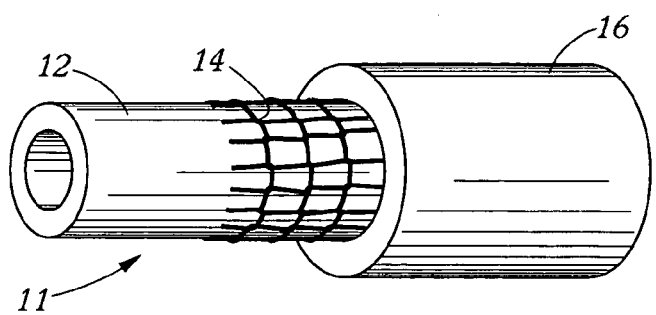
FIG. 1 is a perspective view, with parts in section, of a hose constructed in accordance with the present invention.

Referring to FIG. 1, a hose is illustrated, constructed according to one embodiment of the present invention. Hose 11 comprises inner tube 12, reinforcing fabric member 14 knit over inner tube 12, and outer cover 16 positioned over knit reinforcement member 14 and inner tube 12. Tube 12 may comprise one or more layers of one or more flexible materials such as an elastomer or a plastic. The inner surface material of the tube may be chosen to withstand the fluids and environmental conditions expected within the hose. Cover 16 may be made of one or more suitable flexible elastomeric or plastic materials designed to withstand the exterior environment encountered. Tube 12 and cover 16 may be made of the same material. Hose 11 may be formed by methods such as molding, wrapping, and/or extrusion.

Figure 3:
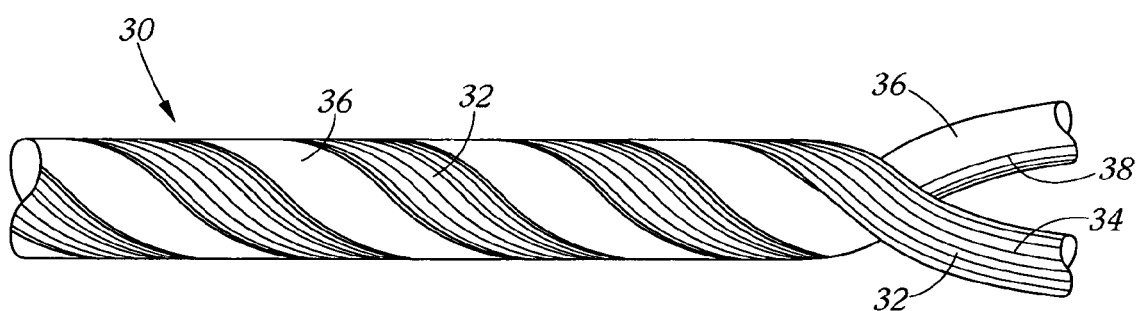
FIG. 3 is a representation of a hybrid yarn according to an embodiment of the present invention.

According to the invention, reinforcing fabric member 14 comprises a hybrid yarn. FIG. 3 illustrates an embodiment of a hybrid yarn according to the invention. Base yarn 32 comprises filaments or fibers 34 of co-para-aramid and may be twisted together as shown with base yarn 36 which comprises filaments or fibers 38 of meta-aramid to form hybrid yarn 30. In the present context "base yarn" refers to a bundle of filaments or fibers in the form as received from a base-yarn manufacturer. A base yarn may include twist or have no twist. "Hybrid yarn" refers to a combination of at least two base yarns of different fiber materials that have been combined, folded, twisted, plied, or cabled together in at least one yarn combining or blending operation. The amount of twist if present is defined as the number of turns per inch ("TPI"). As in the illustration of FIG. 3, the relative sizes of the two base yarns may be approximately equal, but other relative sizes are within the scope of the invention as discussed below. Reinforcing fabric member 14, hybrid yarn 30, and/or base yarn 32 and/or 36 may comprise an adhesive treatment or exhibit some degree of direct bonding of elastomer or plastic layers to the reinforcement member. Alternately, an untreated reinforcement member and/or yarns may be used, and adhesion may be primarily a result of strike-through of elastomer or plastic materials, i.e. mechanical adhesion. Thus, reinforcing fabric member 14 may be embedded in a layer of flexible hose material or embedded between two layers of hose material, e.g., between tube 12 and cover 16.

The hybrid yarn may be formed of at least one base yarn of co-para-aramid fibers and at least one base yarn of meta-aramid fibers which are combined by any of a number of suitable methods into a yarn, which is then knit and generally arranged to be in contact with at least a portion of or embedded in the elastomeric portion of the hose, By aramid is meant a long chain synthetic aromatic polyamide having its amide linkages attached directly to two aromatic rings in either the para- or meta-position. Para-aramids include for example, poly(para-phenylene terephthalamide) ("PPD-T"), poly(p-benzamide), or the like, and fibers of such are sold for example under the trademark KEVLAR by E.I. DuPont de Nemours and Company and the trademark TWARON by Teijin Ltd. Meta-aramids include for example poly(meta-phenylene isophthalamide) ("MPIA"), such as in fibers sold under the trademark NOMEX by E.I. DuPont de Nemours and Company and sold under the trademark TEIJINCONEX by Teijin Ltd. Co-para-aramids are copolymers of two or more different para-aramid monomers, for example, co-poly(p-phenylene terephthalamide and 3,4'-oxydiphenylene terephthalamide), such as in fibers sold under the trademark TECHNORA by Teijin Ltd. Thus, a distinction is herein intended between para-aramids and co-para-aramids. In the present invention, a suitable co-para-aramid yarn comprises TECHNORA® fiber, and a suitable meta-aramid yarn comprises NOMEX® fiber. It is envisioned that some advantageous use may result from a hybrid yarn of any para-aramid fiber combined with any meta-aramid fiber.

The base yarn size is not limited in the practice of the invention, but is only limited by the availability of base yarns from the manufacturers. The final hybrid yarn size is not particularly limited in the practice of the invention, but may be controlled as desired for a particular application by suitable choice of base yarn or yarns. In one embodiment of the invention, base yarns of from about 400 denier to about 3000 denier may be used. Multiples of one or both base yarns may be combined. Thus, the hybrid yarn size may be in the range of from about 800 to about 30,000 denier. In one embodiment, a 1500 denier co-para-aramid base yarn and a 1200 denier meta-aramid base yarn are combined to provide a 2700 denier hybrid yarn with a twist of about 3 TPI. The twist levels of the base yarns and hybrid yarn are not particularly limited. In a preferred embodiment, two base yarns have zero twist and the hybrid yarn has twist in the range from 0 TPI to about 5 TPI or from about 1 TPI to about 5 TPI.

It is believed that the relative amounts of the two base yarns are not critical, as long as a predetermined amount of lower modulus meta-aramid yarn is sufficient to provide some degree of coverage of higher modulus co-para-aramid yarn after twisting. It is believed that an amount of meta-aramid yarn in the range of from about 10% to about 90%, or from about 30% to about 70%, based on the total denier is sufficient to make a useful hybrid yarn of the invention. As illustrated in FIG. 3, some portion of surface fibers of the hybrid cord comprise each type of fibers used in two base yarns. Thus, when predetermined amounts of each yarn are chosen so that the lower modulus meta-aramid yarn at least partially covers or wraps or protects the higher modulus co-para-aramid, it is believed that the meta-aramid yarn prevents the co-para-aramid yarn from abrading on itself during repeated stress or pressure cycles or impulses and/or during knitting or processing. The improved burst pressure obtained with this invention is indicative of significantly better retained tensile strength of the yarn after enduring the knitting process. The present invention may be contrasted with alternative approaches based on sheathing, completely wrapping, or fully protecting one yarn type with another. One advantage of the present invention is that such sheathing is not required. Nevertheless, a more durable hose is provided, i.e., a hose with improved burst pressure and/or improved impulse fatigue resistance.

The methods and machinery used for twisting and plying the base yarns to form the hybrid yarn are not particularly limited. Suitable textile twisting machines include for example a ring twister, a 2-for-1 twister, a direct cabler, and any other twister known in the art. The base yarns or fibers may be co-mingled, co-plied, or co-twisted at any convenient stage of the yarn or hose manufacturing process. For example, the hybrid yarn may be twisted and optionally treated with adhesive before being place into a knitter for knitting a reinforcement layer of a hose. Alternately, two base yarns may be supplied to a knitter which then forms the hybrid yarn from two base yarns as it knits a reinforcement layer onto a tube or a hose.

Reinforcement member 14 may be knit around tube 12 using any of a number of methods of knitting such as known in the art. The knitting may, for example, comprise a plain stitch or a lock stitch. Any suitable number of ends, needles, and/or knitting heads may be used. Stitch or loop size is not particularly limited in the practice of the invention. In an embodiment of the invention, the knitting is performed at from about 50 to about 200 loops per foot, or from about 80 to about 150 loops per foot. Although a knit reinforcement is preferred, it is envisioned that the inventive yarn may alternately be used advantageously in the form of a braided or spiraled yarn, or in the form of a wrapped woven, nonwoven, or tire cord fabric reinforcement. Reinforcing fabric member 14 may comprise one or more layers of fiber or textile reinforcement and/or one or more types of fiber reinforcement materials or forms.

The base yarns and/or hybrid yarn may be treated with one or more primer or adhesive compositions utilizing any suitable and/or conventional materials and application processes, in order to establish or improve their adhesion to the surrounding elastomer constituents of the article as is well known in the art. For example the yarn may be treated with an adhesive, or adhesives, to bond the filaments to each other and to promote the adhesion of the yarn to an elastomeric material of the hose. The yarn could be first treated with a primer, which could be either aqueous-based or solvent-based, such as polyisocyanates and epoxy compounds. The treated yarn could be then treated with another suitable adhesive such as resorcinol formaldehyde latex ("RFL"). After each treatment, the yarn may be passed through an oven or a series of ovens at temperatures typically from 100° C. to 290° C. to dry and cure the adhesives. Alternatively, the treated yarn could be air dried or wet wound. Optionally the yarn could be then treated with an additional overcoat adhesive, e.g., a mixture of high emulsions, pigments and curatives in a water-based medium, or a mixture of pigments and curatives with dissolved polymers in a solvent solution such as those available under the trademark CHEMLOK by Lord Corporation, or other suitable rubber cements, for additional adhesion improvement. It should be recognized that untreated aramid yarns are generally most susceptible to fiber-on-fiber abrasion during dynamic use, and one advantage of the inventive hose is a dramatic performance improvement obtained even without resort to any such adhesive treatment on the hybrid yarn.

In an embodiment of low-pressure fluid-transfer hose the primary reinforcement may be one or more knit layers of the hybrid yarn. By primary reinforcement is meant that when the hose comprises more than one form or composition of textile reinforcement, then more than half of the burst pressure rating of the hose is attributable to the primary reinforcement.

Hose body portions such as tube 12 and cover 16 may be formed of any suitable cured elastomer composition, and the respective compositions may be the same as or different from each other. Suitable elastomers that may be utilized for this purpose include for example polyurethane elastomers (including as well polyurethane/urea elastomers") ("PU"), polychloroprene rubber ("CR"), acrylonitrile butadiene rubber ("NBR"), hydrogenated NBR ("HNBR"), styrene-butadiene rubber ("SBR"), alkylated chlorosulfonated polyethylene ("ACSM"), epichlorohydrin, polybutadiene rubber ("BR"), natural rubber ("NR"), and ethylene alpha olefin elastomers such as ethylene propylene copolymers ("EPM"), ethylene propylene diene terpolymers ("EPDM"), ethylene octene copolymers ("EOM"), ethylene butene copolymers ("EBM"), ethylene octene terpolymers ("EODM"); and ethylene butene terpolymers ("EBDM"); ethylene vinylacetate elastomers ("EVM"); ethylene methylacrylate ("EAM"); chlorinated polyethylene ("CPE"); fluoro-elastomers; and silicone rubber, or a combination of any two or more of the foregoing. Suitable elastomers for radiator hose, heater hose and CAC hose include EPDM and CPE.

To form tube 12 and/or cover 16 in accordance with an embodiment of the present invention, elastomer(s) may be blended with conventional rubber compounding ingredients including fillers, plasticizers, stabilizers, coagents, vulcanization agents, curatives, and accelerators, and the like, in amounts conventionally employed. For example, for use with ethylene-alpha-olefin elastomer and diene elastomers such as SBR or HNBR, one or more metal salts of alpha-beta organic acids may be employed in amounts useful to improve dynamic performance of the resultant article. Thus zinc dimethacrylate and/or zinc diacrylate may be utilized in such compositions in amounts of from about 1 to about 50 phr; or alternatively of from about 5 to about 30 phr; or of from about 10 to about 25 phr. These materials furthermore contribute to the adhesiveness of the composition, and increase the overall cross-link density of the polymer upon curing with peroxide or related agents through ionic crosslinking.

One skilled in the relevant art would readily appreciate any number of suitable compositions for utilization in or as the elastomeric portions of the hose. A number of suitable elastomer compositions are described for example in The R. T. Vanderbilt Rubber Handbook ($13^{th}$ ed., 1996), and with respect to EPM or EPDM, compositions having particularly high tensile modulus properties are furthermore set forth in U.S. Pat. Nos. 5,610,217, and 6,616,558 respectively, the contents of which, with respect to various elastomer compositions that may be suitable for use in the formation of hose portions, are specifically incorporated herein by reference.

The elastomeric hose compositions may moreover be loaded with discontinuous fibers, utilizing materials such as including but not limited to cotton, polyester, fiberglass, carbon, aramid and nylon, in such forms as staple, milled, or chopped fibers, flock or pulp, in amounts generally employed. The fiber loading may have some degree of orientation as a result of the extrusion or other formation process employed.

One hose construction has been illustrated in FIG. 1. It should be understood that a wide variety of other constructions may be utilized in carrying out the invention. For example, the hose may have additional inner, outer, or intermediate layers comprising plastic or elastomeric compositions for particular purposes such as fluid resistance, environmental resistance, or physical characteristics and the like. As another example, additional textile or metal reinforcements, jackets, covers or the like may be utilized as needed or desired. Helical wires may be built into the hose wall or utilized inside the hose for collapse resistance.

Figure 2:
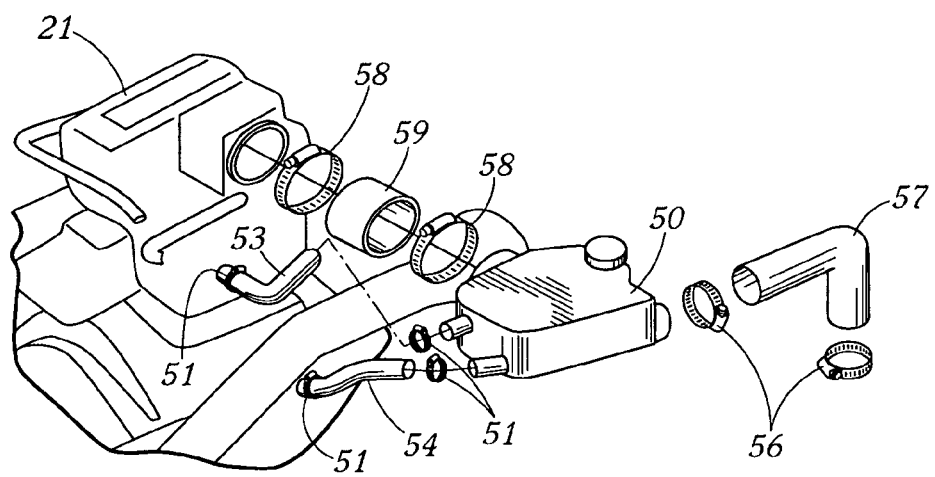
FIG. 2 is a schematic representation of a turbocharger intake system utilizing an embodiment of the present invention.

In operation, a hose is a component of a hose assembly or a fluid transfer system. A fluid transfer system generally comprises a hose, and at one or more ends of the hose, one or more clamps, couplings, connectors, and/or fittings, fluid handling devices, and the like. By way of example, FIG. 2 is a schematic representation of a CAC turbocharger hose system employing embodiments of the inventive hose. Referring to FIG. 2, intake hose 57 is attached with associated clamps 56 to charge air cooler 50 for supplying incoming air to the system. Coolant is transferred to and from charge air cooler 50 through coolant hoses 53 and 54, which are attached with clamps 51. CAC hose 59 provides a fluid connection from charge air cooler 55 to turbocharger 21, with associated clamps 58. In this illustrative figure, hose connectors are integrally molded onto associated devices. In some CAC applications, metal tubes and hose sections may be attached together to transfer air. In some CAC applications, such metal tubes may be unsupported, or only supported by the hose itself, resulting in abnormally severe vibration and early failure of conventional hose. In other CAC system applications, a coolant hose may be very short and/or bent or formed at an angle, also resulting in exposure to severe vibrations and early failure of conventional hoses. The inventive hose performs significantly better than conventional hose under such adverse conditions.

Any suitable and/or conventional method may be utilized to form the hose in accordance with various embodiments of the present invention. For example, where non-castable hose elastomers are utilized, i.e., millable rubbers, either with or without fiber loading, the hose building steps may include those of extruding or wrapping a hose inner tube; knitting the hybrid yarn to form a reinforcing textile layer over the inner tube; extruding or wrapping an outer cover over the reinforced inner tube; and applying sufficient temperature and pressure to cure or vulcanize the elastomer materials. The hose may be built and/or extruded and/or cured on a mandrel or form, or manufactured by other suitable methods known in the art including using internal air or other pressure to keep the hose round after extruding or wrapping. The hose may be cut to length and then shaped and/or cured on curved mandrels.

Where other types of hose elastomers are utilized, e.g., thermoplastic or thermoplastic elastomer hose manufacture, the production steps may omit curing or vulcanizing steps. The hose may be round or may have any suitable shape, section, or curvature.

In the illustrations and examples that follow, burst pressure is measured by filling a hose with oil or other appropriate hydraulic fluid and pressurizing until it bursts.

Impulse fatigue resistance is tested by cycling hot air pressure within a 16-inch long straight hose from zero psig to the peak test pressure at a rate of eight cycles per minute. Impulse fatigue resistance is measured by the number of pressure pulse cycles to rupture or fail the hose. In addition to pressure pulsing, one end of the hose is oscillated at 120 cycles per minute by moving or displacing the hose end along a circular path to simulate engine or vehicle vibrations in a truck or automotive application. The most important factor in determining hose life on this test is peak pressure. Conventional constructions have performed adequately at 45 psi and even 60 psi internal pressure. However, at 80 psi the inventive hose dramatically outperforms conventional hose.

Illustration A.

Illustration A, tabulated in Table 1 below, compares general field experience for three constructions of four-inch diameter CAC hose, along with some limited lab test data, and shows the improved performance of the inventive hose. Each of the three hoses of this illustration was constructed with an EPDM rubber composition for the cover and either a CPE or EPDM composition for the tube. (CPE is used instead of EPDM on applications requiring some oil resistance and is not a factor in pressure rating or fatigue performance.) Comparative Example 1 is a typical construction developed in the 1980's and successfully utilized for many years when turbocharger systems did not exceed 45 psi maximum system pressure. It utilized a TECHNORA® yarn of 1500-denier as a conventional knit reinforcement. Comparative Example 2 represents an improved construction developed in the 1990's for low pressure turbocharger systems with excessive vibration. It utilized a conventional knit reinforcement of NOMEX® yarn of 1200×2 construction or 2400 denier total, which provided superior fatigue resistance than the earlier TECHNORA® yarn construction. However, under the increased demands of modern turbochargers including higher peak system pressures and increased vibration, both comparative examples fail prematurely in the field.

Inventive Example 3 utilizes a hybrid yarn consisting of a 1500-denier TECHNORA® yarn and a 1200-denier NOMEX® yarn plied and twisted together at 3.0 TPI, then wound onto a 3°30' cone. For all three hose constructions, the reinforcements were knit with a plain stitch on a 5-inch knitter head with 36 needles at 130 loops per foot. The results in Table 1 show that only the Example 3 hose meets current needs on a field turbocharger test. The inventive hose of Example 3 also performed well on an impulse fatigue resistance test, exhibiting a life of at least 300,000 cycles. The burst pressure, both at room temperature ("RT") and 200° F., of the Example 3 hose construction is also higher than the Comparative Example 2. The hot burst test was only carried out as a relative comparison, under conditions for which absolute pressure values were not reliable. It may be noted that the RT burst pressure of Example 3 is significantly higher than would be expected from a simple sum of the burst pressure of Comparative Example 1 and half that of Comparative Example 2.

To illustrate an alternate manufacturing technique for the inventive hose, another example four-inch hose was made using a hybrid knitting arrangement wherein a 1500-denier TECHNORA® yarn was fed into the knitter along with a 1200-denier NOMEX® yarn and both yarns knit together to form a hybrid-reinforced hose.

TABLE 1

| Example | Cord Material | Twist (TPI) | Yarn Tensile Strength (lbf) | Burst (psi) RT | pressure (relative) 200° F. | Field Test Result[2] | Impulse Fatigue Resistance[1] (cycles) |
|---|---|---|---|---|---|---|---|
| Comparative 1 | TECHNORA ® | 0 | 78 | 118 | — | Fail | — |
| Comparative 2 | NOMEX ® | 2.3 Z | 24 | 134 | 1.0 | Fail | — |
| Example 3 | TECHNORA ®/NOMEX ® | 3.0 Z | 79 | 226 | 1.4 | Pass | >300k |

[1] 8 pulse cycles/min, 120 oscillation cycles/min, 16-inch straight hose, 45 psi peak pressure.
[2] Field results are for newer, higher-pressure turbocharger CAC systems.

Illustration B

Illustration B, tabulated in Table 2 below, illustrates the advantages of the invention when utilized in lab tests of radiator hose. Three 2.5-inch diameter straight radiator hoses were constructed utilizing an EPDM rubber composition for both the inner tube and the cover. Comparative Example 4 utilized a conventional knit reinforcement of TWARON® para-aramid yarn of 1500 denier with 69 pound test rating. Comparative Example 5 utilized a conventional knit reinforcement of 1500-denier TECHNORA® co-para-aramid yarn with 78 pound test rating, as used in earlier Comparative Example 1. Example 6 utilized the hybrid yarn of Example 3, consisting of a 1500-denier TECHNORA® yarn and a 1200-denier NOMEX® yarn plied or twisted together as in Example 3 above. The radiator hose reinforcement was knit with a lock stitch on a 4-inch knitter head with 24 needles at 96 loops per foot. While all three hose examples of Table 2 had similar original burst pressures (around 125 psi±10 psi) and were designed to meet the SAE J20 standard for type 20R4 with a minimum requirement of 80 psi, the results in Table 2 show that the Example 6 hose had much better impulse fatigue resistance than the Comparative 4 or 5 hose when tested at 80 psi and 302° F. Thus, the present invention provides a hose with a knit reinforcement of hybrid yarn having a greatly improved impulse fatigue resistance than conventional hose. In other, less rigorous testing, namely during 250° F. impulse fatigue testing at 45 and 60 psi, Example 6 exhibited somewhat less diameter growth than Comparative 4 or 5, but all three survived over 300,000 pulse cycles.

radiator, air intake, brake, or fuel hose and the like; industrial transfer hose for air, steam, water, chemicals and the like; wrapped hose; etc. Thus by constructing the yarn of a reinforcement for a hose with a co-para-aramid/meta-aramid hybrid yarn, the present invention provides a method of increasing both the flexural fatigue resistance and the durability of a hose, compared to hose constructed in accordance with conventional reinforcement techniques.

While the embodiments of articles comprising the hybrid yarn of the present invention shown in the drawings are a hose and a hose system, it is anticipated that the hybrid yarn of the present invention may also be useful in providing load carrier cords for tires, air springs, and other composite rubber articles subject to dynamic loads. Usage of load carrier cord in air springs is described for example in U.S. Pat. No. 4,954,194, and the contents of that publication with respect to same are incorporated herein by reference. Usage of load carrier cord for carcass and/or tread reinforcement in tires is described for example in U.S. Pat. No. 3,616,832, and the contents of that publication with respect to same are incorporated herein by reference.

Although the present invention has been described in detail for the purpose of illustration, it is to be understood that such detail is solely for that purpose and that variations can be made therein by one skilled in the art without departing from the scope of the present invention except as it may be limited by the claims. The invention disclosed herein may suitably be practiced in the absence of any element that is not specifically disclosed herein.

TABLE 2

| Example | Cord Material | Twist | Yarn Tensile Strength (lbf) | Original Burst Strength (psi) | Impulse Fatigue Resistance[1] (pulse cycles) |
|---|---|---|---|---|---|
| Comparative 4 | TWARON ® | 0 | 69 | 128 | 386 |
| Comparative 5 | TECHNORA ® | 0 | 78 | 120 | 1620; 2833 |
| Example 6 | TECHNORA ®/NOMEX ® | 3.0 z | 79 | 135 | >101,616; >102,600[2] |

[1] Conducted at 80 psi; 302° F.; 8 pulse cycles/min.; 120 oscillating cycles/min; 16-inch hose.
[2] Example 6 hoses did not fail, test aborted.

While the illustrations provided above describe specifically low-pressure fluid-transfer hose having tube, cover, and knit reinforcement members, one of ordinary skill in the relevant art would readily appreciate that the present invention is not so limited; and that benefits of the present invention could be derived in any application requiring both a high degree of durability (i.e., retention of burst pressure capability) and fatigue resistance (e.g., resistance to pressure pulses or flexing deformation) including for example: hydraulic hose; hose used in automotive/truck applications such as

What is claimed is:

1. A flexible hose comprising a tube, a knit fabric, and a cover; said knit fabric comprising a hybrid yarn comprising a first yarn of co-para-aramid filaments and a second yarn of meta-aramid filaments.

2. The hose of claim 1 wherein filaments at a surface of said hybrid yarn comprise both co-para-aramid filaments and meta-aramid filaments.

3. The hose of claim 1 wherein said knit fabric resides embedded in said hose.

4. The hose of claim 3 wherein said knit fabric resides in between said tube and said cover.

5. The hose of claim 1 wherein said first yarn and said second yarn are twisted together at up to about 5 turns per inch.

6. The hose of claim 1 wherein said co-para-aramid filaments comprise a copolymer of para-phenylene terephthalamide and 3,4-oxydiphenylene terephthalamide.

7. The hose of claim 1 wherein said meta-aramid filaments comprise poly-meta-phenylene isophthalamide.

8. The hose of claim 1 wherein said co-para-aramid filaments comprise a copolymer of para-phenylene terephthalamide and 3,4-oxydiphenylene terephthalamide, and said meta-aramid filaments comprise poly-meta-phenylene isophthalamide.

9. The hose of claim 1 wherein said first yarn and said second yarn are twisted together at about 1 to about 5 turns per inch.

10. The hose of claim 1 wherein said knit fabric comprises from about 50 to about 200 loops per foot.

11. The hose of claim 1 wherein said hybrid yarn comprises a base yarn having no additional adhesive treatment for bonding said filaments together or for bonding said cord to said body.

12. The hose of claim 1 in the form of a radiator hose, coolant hose, heater hose, or charge air cooler hose.

13. A hose assembly comprising a flexible hose comprising an inner tube; an outer cover; a knit fabric residing between said tube and said cover and comprising a hybrid yarn comprising a first yarn of co-para-aramid filaments and a second yarn of meta-aramid filaments; and at least one fitting, clamp, coupling, or fluid handling device associated with said hose.

14. The assembly of claim 13 in the form of a charge air cooler turbocharger intake hose system, and further comprising a charge air cooler.

15. A method comprising:
combining at least a first base filament yarn comprising co-para-aramid filaments and a second base filament yarn comprising meta-aramid filaments to form a hybrid yarn;
forming a tube;
knitting said hybrid yarn to form a reinforcing fabric layer on said tube; and
forming a cover about said tube and fabric layer.

16. The method of claim 15 wherein said combining comprises twisting said base yarns together at a twist of up to 5 TPI.

17. The method of claim 16 wherein said knitting comprises from about 50 to about 200 loops per foot.

18. The method of claim 17 wherein said first base yarn comprises a copolymer of para-phenylene terephthalamide and 3,4-oxydiphenylene terephthalamide, as the co-para-aramid filaments and said second base yarn comprises poly-meta-phenylene isophthalamide as the meta-aramid filaments.

19. A low-pressure fluid transfer hose comprising a tube, a cover, and a knit fabric reinforcement as the primary reinforcement; said knit reinforcement embedded between said cover and said tube and comprising a hybrid yarn comprising a first base yarn of co-para-aramid filaments and a second base yarn of meta-aramid filaments; said first yarn and said second yarn twisted together with from 1 to about 5 turns per inch; and said knit reinforcement comprising from about 50 to about 200 loops per foot.

20. The hose of claim 19 wherein said tube comprises ethylene propylene diene terpolymer or chlorinated polyethylene and said cover comprises ethylene propylene diene terpolymer or chlorinated polyethylene.

\* \* \* \* \*